(12) United States Patent
Doornenbal

(10) Patent No.: US 10,713,426 B2
(45) Date of Patent: Jul. 14, 2020

(54) SYSTEMS, COMPUTER-PROGRAM PRODUCTS AND METHODS FOR ANNOTATING MULTIPLE CONTROLLED VOCABULARY-DEFINED CONCEPTS IN SINGLE NOUN PHRASES

(71) Applicant: Elsevier B.V., Amsterdam (NL)

(72) Inventor: Marius Doornenbal, Meteren (NL)

(73) Assignee: Elsevier B.V., Amsterdam (NL)

( * ) Notice: Subject to any disclaimer, the term of this patent is extended or adjusted under 35 U.S.C. 154(b) by 1475 days.

(21) Appl. No.: 14/080,141

(22) Filed: Nov. 14, 2013

(65) Prior Publication Data

US 2015/0134324 A1 May 14, 2015

(51) Int. Cl.
*G06F 40/169* (2020.01)

(52) U.S. Cl.
CPC ................. *G06F 40/169* (2020.01)

(58) Field of Classification Search
CPC ..... G06F 17/241; G06F 17/28; G06F 17/2775
USPC ........................................................ 704/4, 9
See application file for complete search history.

(56) References Cited

U.S. PATENT DOCUMENTS

| | | | |
|---|---|---|---|
| 5,842,217 A | 11/1998 | Light | |
| 6,349,282 B1 | 2/2002 | Van Aelten et al. | |
| 6,389,412 B1 | 5/2002 | Light | |
| 6,480,835 B1 | 11/2002 | Light | |
| 6,754,617 B1 | 6/2004 | Ejerhed | |
| 7,464,020 B1 | 12/2008 | Wong | |
| 7,555,428 B1 | 6/2009 | Franz et al. | |
| 2002/0128821 A1* | 9/2002 | Ehsani ................. | G06F 40/35 704/10 |
| 2009/0083027 A1* | 3/2009 | Hollingsworth ...... | G06F 40/284 704/9 |

(Continued)

FOREIGN PATENT DOCUMENTS

EP 0566848 10/1993

OTHER PUBLICATIONS

Arens et al., 1987. Phrasal analysis of long noun sequences. In Proceedings of the 25th annual meeting on Association for Computational Linguistics (ACL '87).*

(Continued)

*Primary Examiner* — Richemond Dorvil
*Assistant Examiner* — Rodrigo A Chavez
(74) *Attorney, Agent, or Firm* — Dinsmore & Shohl LLP

(57) ABSTRACT

Systems, computer-program products and methods for annotating electronic text documents with multiple entities defined in a controlled vocabulary extracted from a compound noun phrase are disclosed. In one embodiment, a method of annotating an electronic text document includes searching, by a computing device, the electronic text document for instances of congruent compound noun phrases including a head and a modifier. If a congruent compound noun phrase is found, the method further includes determining a preceding word that precedes the modifier of the congruent compound noun phrase, and searching a controlled vocabulary for a second full term having the preceding word and the head of the congruent compound noun phrase. If the second full term is found in the controlled vocabulary, the method further includes annotating the electronic text document with the second full term having the preceding word and the head of the congruent compound noun phrase.

20 Claims, 4 Drawing Sheets

(56) References Cited

U.S. PATENT DOCUMENTS

| | | | |
|---|---|---|---|
| 2011/0071829 A1 | 3/2011 | Itoh | |
| 2011/0295903 A1* | 12/2011 | Chen | G06F 16/285 |
| | | | 707/794 |
| 2013/0173247 A1* | 7/2013 | Hodson | G06F 40/45 |
| | | | 704/4 |
| 2014/0082003 A1* | 3/2014 | Feldman | G06F 16/3344 |
| | | | 707/755 |
| 2015/0006533 A1* | 1/2015 | Shinzato | G06F 16/3344 |
| | | | 707/737 |

OTHER PUBLICATIONS

Arens et al., 1987. Phrasal analysis of long noun sequences. In precedings of the 25$^{th}$ annual meeting on Association for Computational Linguistics (ACL'87).*

* cited by examiner

SYSTEMS, COMPUTER-PROGRAM PRODUCTS AND METHODS FOR ANNOTATING MULTIPLE CONTROLLED VOCABULARY-DEFINED CONCEPTS IN SINGLE NOUN PHRASES

BACKGROUND

Field

The present specification generally relates to systems, computer-program products and methods for annotating documents and, more particularly, to systems, computer-program products, and methods for annotating documents with multiple entities found in a controlled vocabulary extracted from a single compound noun phrase.

Technical Background

Electronic text documents may be annotated with information. Annotations may be provided in metadata, for example. Markup languages, such as XML, may be utilized to provide additional information regarding an electronic text document beyond the original text. In some cases, an electronic text document is annotated with information regarding the subject matter discussed within the electronic text document.

Compound noun phrases are multiple word phrases that comprise at least one modifier and a head. For example, in the compound noun phrase "thin film," the word "thin" is the modifier and the word "film" is the head. In some instances, a compound noun phrase may have multiple modifiers, such as "epitaxial thin film," wherein both "epitaxial" and "thin" are modifiers that modify head word "film." Such compound noun phrases may be referred to as interdigitated terms. In the present example, the word "thin" appears between "epitaxial" and "film." In current systems, term annotations are disallowed on electronic document texts if there are meaningful intervening words or tokens. However, multiple phrases may be intended by an interdigitated term. Electronic text documents are therefore not annotated with information regarding these hidden phrases.

Accordingly, a need exists for alternative methods for extracting information from single compound noun phrases to provide additional annotation information for electronic text documents.

SUMMARY

In one embodiment, a method of annotating an electronic text document includes searching, by a computing device, the electronic text document for instances of congruent compound noun phrases including a head and a modifier. If a congruent compound noun phrase is found, the method further includes determining a preceding word that precedes the modifier of the congruent compound noun phrase, and searching a controlled vocabulary for a second full term having the preceding word and the head of the congruent compound noun phrase. If the second full term is found in the controlled vocabulary, the method further includes annotating the electronic text document with the second full term having the preceding word and the head of the congruent compound noun phrase.

In another embodiment, a computer-program product includes a computer-readable medium storing executable instructions that, when executed by a computing device, cause the computing device to search an electronic text document for instances of congruent compound noun phrases having a head and a modifier. If a congruent compound noun phrase is found, the executable instructions further cause the computing device to further determine a preceding word that precedes the modifier of the congruent compound noun phrase, and searches a controlled vocabulary for a second full term having the preceding word and the head of the congruent compound noun phrase. If the second full term is found in the controlled vocabulary, the executable instructions further cause the computing device to annotate the electronic text document with the second full term having the preceding word and the head of the congruent compound noun phrase.

In yet another embodiment, a system for annotating documents includes a processor, and a computer-readable medium storing a controlled vocabulary and executable instructions that, when executed by the processor, cause the processor to search an electronic text document for instances of congruent compound noun phrases comprising a head and a modifier. If a congruent compound noun phrase is found, the processor determines a preceding word that precedes the modifier of the congruent compound noun phrase, and searches the controlled vocabulary for a second full term comprising the preceding word and the head of the congruent compound noun phrase. If the second full term is found in the controlled vocabulary, the processor annotates the electronic text document with the second full term comprising the preceding word and the head of the congruent compound noun phrase.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
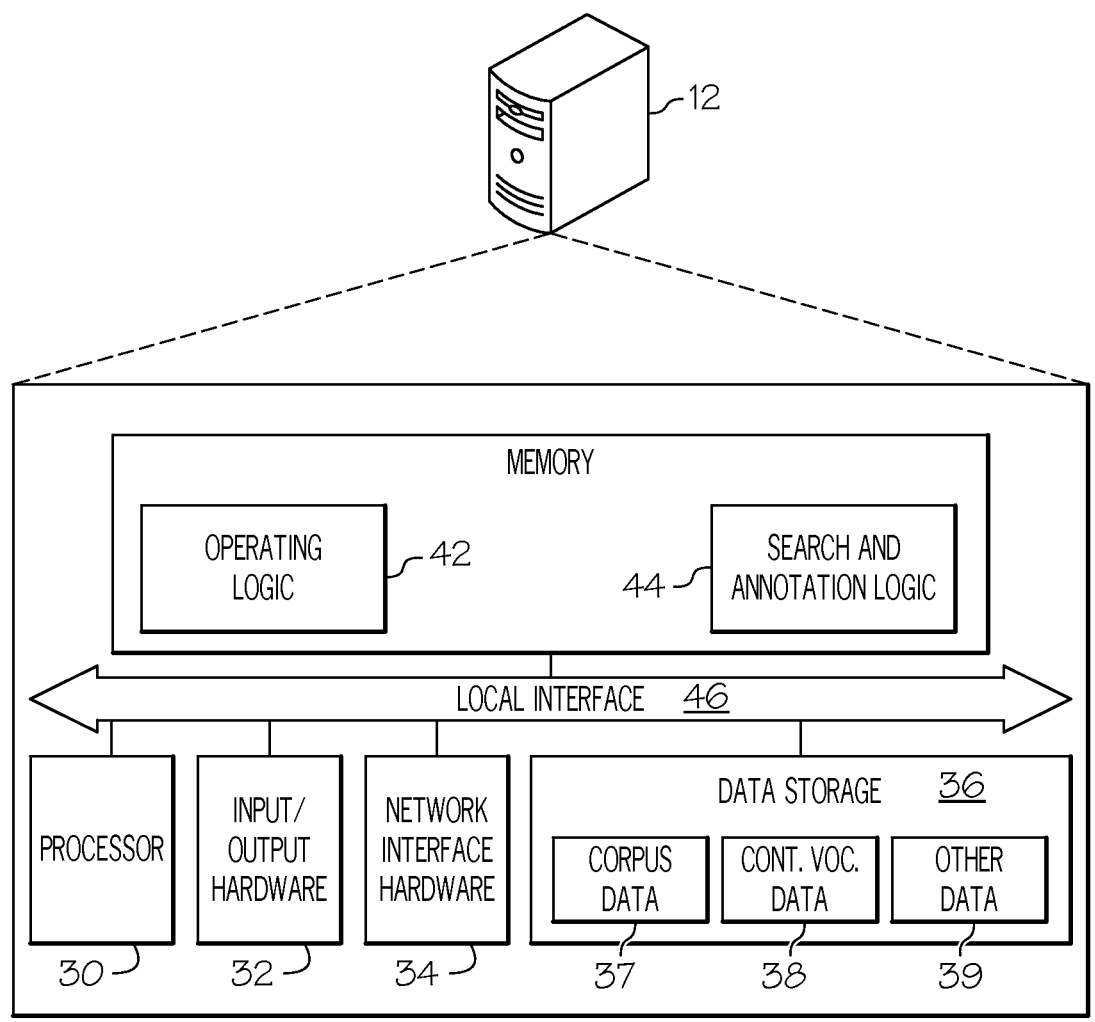
FIG. 1 depicts a schematic illustration of a computing device illustrating hardware and software that may be utilized to extract multiple entities defined in a controlled vocabulary and annotate electronic text documents according to one or more embodiments shown and described herein.

Referring generally to the figures, embodiments described herein are directed to systems, computer-program products, and methods for extracting multiple entities provided in a controlled vocabulary from a single noun phrase, such as a compound noun phrase. A compound noun typically comprises a head and a modifier. As a non-limiting example, the word "film" is the head of the compound noun phrase "thin film," while the word "thin" is the modifier. In many cases, two or more modifiers may be present within a compound noun phrase. In such cases, two or more phrases may be extracted from the compound noun phrase. For example, the phrase "epitaxial thin film" may be present within the text of an electronic text document. The phrases "epitaxial film" and "thin film" may be extracted from the single phrase "epitaxial thin film." However, it is not enough to assume that a three (or more) word phrase contains valid multi-word phrases (i.e., phrases found in a controlled vocabulary). For example, the compound noun phrase "natural language generation" should not yield "natural generation" as "natural" modifies "language," not "generation."

Embodiments of the present disclosure are directed to systems, computer-program products, and methods of extracting multiple phrases from a single compound noun phrase. If such phrases are found as entities provided in a controlled vocabulary (i.e., controlled vocabulary-defined concepts), the electronic text document is annotated with information pertaining to the multiple phrases found in the controlled vocabulary. Using the compound noun phrase "epitaxial thin film" example, if both "epitaxial film" and "thin film" are found in the controlled vocabulary, the electronic text document may be annotated with these compound noun phrases and, in some embodiments, the meaning associated therewith. Various embodiments of systems, computer-program products, and computer-implemented methods for extracting multiple controlled vocabulary entities from a single compound noun phrase are described below.

The systems, computer-program products and methods described herein may be utilized to extract multiple compound noun phrases from any type of text document, including, but not limited to, patent documents, legal documents, agricultural documents, scientific research documents, news articles, and journals. As used herein, the phrase "compound noun phrase" means a multi-word phrase comprising a head and at least one modifier. The phrase "congruent compound noun phrases" means a compound noun phrase wherein the linguistic, syntactic head of a compound noun phrase is the linguistic parent as defined by the controlled vocabulary, and the context of the compound noun phrase is discernible from the modifier. Further, the phrase "controlled vocabulary" means any data structure wherein terms and phrases are organized. Example controlled vocabularies include, but are not limited to, thesauri, taxonomies, and subject indexes. As used herein, "interdigitated terms" means a compound noun phrase having multiple domain-defined entities in the controlled vocabulary.

FIG. 1 depicts a computing device 12 illustrating a computer-implemented system for extracting multiple defined entities (i.e., multiple compound noun phrases) in a controlled vocabulary from a single compound noun phrase, and/or a non-transitory computer-readable medium for extracting multiple defined entities, software, and/or firmware, according to embodiments shown and described herein. While in some embodiments, the computing device 12 may be configured as a general purpose computer with the requisite hardware, software, and/or firmware, in some embodiments, the computing device 12 may be configured as a special purpose computer designed specifically for performing the functionality described herein. The computing device 12 may be configured as any computing device, such as, but not limited to, a personal computer, a laptop computer, a tablet computer, and a smart phone. Although FIG. 1 depicts an embodiment wherein the described computer-implemented method is performed by a single computing device, embodiments are not limited thereto. For example, embodiments may be configured as networked computing devices, such that any number of computing devices may be communicatively coupled to perform the methods described herein in a distributed computing manner.

As also illustrated in FIG. 1, the computing device 12 may include a processor 30, input/output hardware 32, network interface hardware 34, a data storage component 36 (which may store corpus data 37, controlled vocabulary data 38, and other data 39), and a non-transitory memory component 40. The memory component 40 may be configured as volatile and/or nonvolatile computer-readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and search and annotation logic 44 (each of which may be embodied as a computer-program, firmware, or hardware, as an example). A local interface 46 is also illustrated in FIG. 1 and may be implemented as a bus or other interface to facilitate communication among the components of the computing device 12.

The processor 30 may include any processing component(s) configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the computing device 12, and may be configured to store one or more pieces of data for access by the computing device 12 and/or other components. As illustrated in FIG. 1, the data storage component 36 may store corpus data 37, which includes electronic text documents. The electronic text documents may include, but are not limited to, scientific journals, agricultural documents, news articles, and patent documents. The corpus data 37 may be stored in one or more data storage devices either internal or external to the computing device. In some embodiments, the electronic text documents may be configured as marked-up electronic documents that have been annotated by a mark-up language, such as XML, for example.

The controlled vocabulary data 38 includes data associated with one or more controlled vocabularies. One or more controlled vocabularies may be utilized for each document corpus. For example, a first controlled vocabulary may be used for a first document corpus containing documents relevant to physics. Any controlled vocabulary may be utilized depending on the topic of the documents stored in the document corpus. Exemplary controlled vocabularies may include, but are not limited to, Compendex, Medical Subject Headings ("MeSH"), National Agricultural Library agricultural thesaurus ("NAL"), as well as custom thesauri or indices.

Similarly, the controlled vocabulary data 38 may be stored by the data storage component 36 local to the computing device or stored remotely from the computing device 12 (e.g., an external storage device, a networked computer, or a remote server). Other data 39 may be stored in the data storage component 36 and may include a data structure(s) in which the annotations described herein are provided and accessed. The other data 39 may also provide support for functionalities described herein (e.g., metadata that may be utilized in conjunction with the corpus data and/or the controlled vocabulary data 38).

Included in the memory component 40 are the operating logic 42 and the search and annotation logic 44. The operating logic 42 may include an operating system and/or other software for managing components of the computing device 12. The search and annotation logic 44 may be configured as computer-readable instructions that provide for the search of both the electronic text documents and controlled vocabularies to extract multiple compound noun phrases appearing in the controlled vocabulary(s), as well as to annotate the electronic text documents accordingly, as described in the computer-implemented methods below.

It should be understood that the components illustrated in FIG. 1 are merely exemplary and are not intended to limit the scope of this disclosure. More specifically, while the components in FIG. 1 are illustrated as residing within the computing device 12, this is a nonlimiting example. In some embodiments, one or more of the components may reside external to the computing device 12. Similarly, while FIG. 1 is directed to the computing device 12, other components may include similar hardware, software, and/or firmware. The processor 30, memory component 40 and search and annotation logic 44 may define a computer-program product for annotating electronic text documents by extracting multiple compound noun phrases from a single compound noun phrase.

As stated above, embodiments of the present disclosure extract multiple entities defined in a controlled vocabulary from a single compound noun phrase. A controlled vocabulary may be designed such that semantically similar compound noun phrases are grouped together or otherwise organized. For example, compound noun phrases such as "epitaxial films" and "thin films" may be organized under head word "films," while "extrusion molding" and "blow molding" may be organized under "molding." It should be understood that these phrases are used here merely for illustrative purposes. Any number of compound noun phrases may be grouped together under a common head.

Each compound noun phrase or term that is present within the controlled vocabulary is a domain-defined entity. In processing text documents, it may be advantageous to extract each domain-defined entity present in the text document for annotation purposes as well as to properly index the text document within the corpus. When interdigitated terms are used in the electronic text document, such as "corrosion-resistant aluminum alloy," "epitaxial thin films," and "ultrasonic surface wave," it may be beneficial to extract additional compound noun phrases found in the controlled vocabulary that are not present within the text, as illustrated below.

"corrosion-resistant aluminum alloy"→"corrosion-resistant alloy," "aluminum alloy;"

"epitaxial thin films"→"epitaxial film," "thin film;" and

"ultrasonic surface wave"→"ultrasonic wave," "surface wave."

By extracting these additional compound noun phrases and annotating the electronic text document accordingly, indexing of the electronic document may be improved. These additional compound noun phrases may also enable more accurate searching of the document corpus by users desiring to surface particular documents based on a search query.

Figure 2:
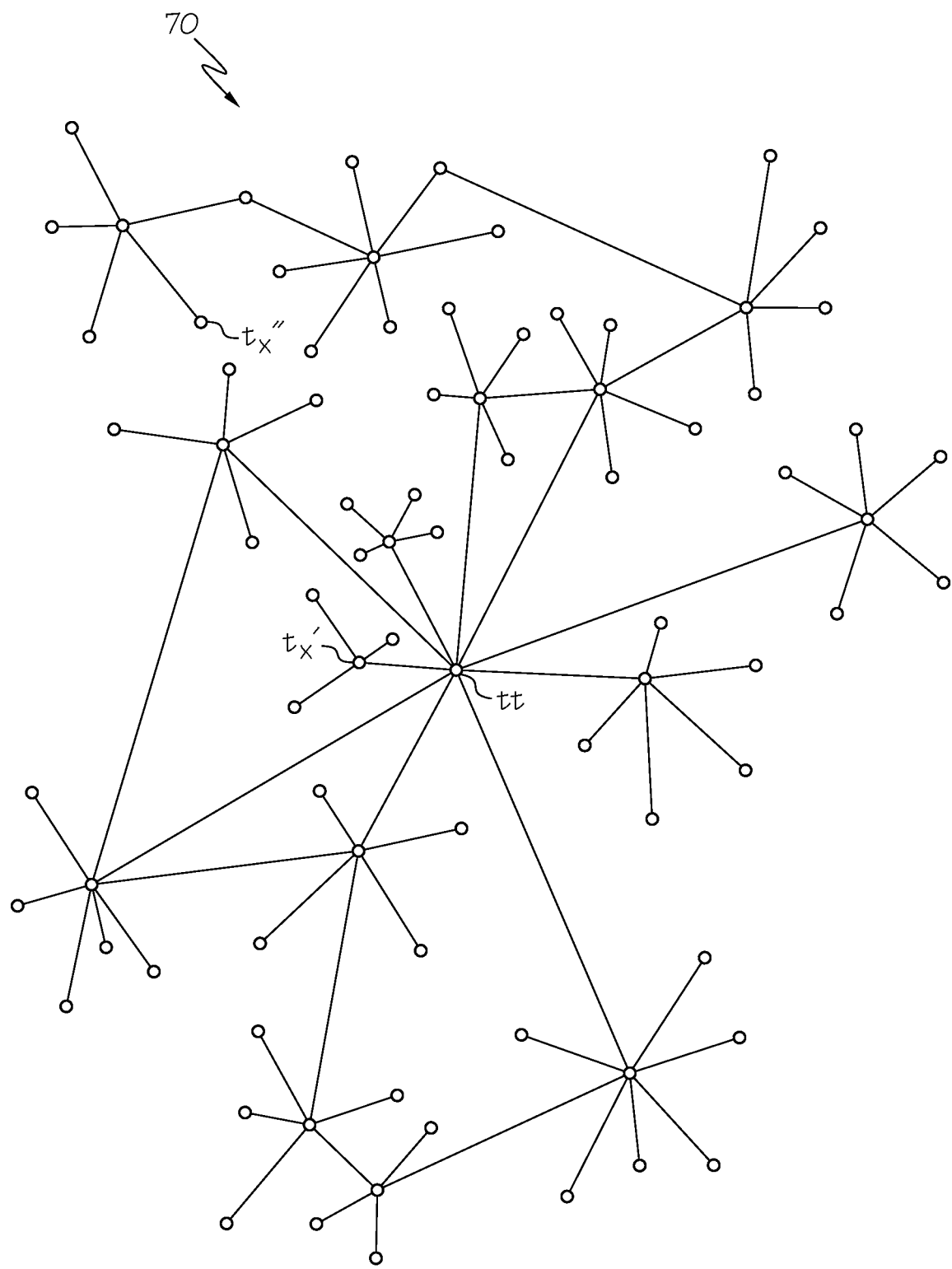
FIG. 2 depicts a graphical representation of an example semantic network defined by a controlled vocabulary.

Controlled vocabularies, such as thesauri, often organize terms by semantic inheritance relationships. As another example, compound noun phrases (i.e., a phrase having a head term and a modifier) are often organized by a common head term. Further, the controlled vocabulary may have other defined relationships between terms, such as by related terms. Accordingly, related concepts are clustered together. Such controlled vocabularies may define a semantic network. The semantic network may be visualized graphically. FIG. 2 is an illustrative example of a graph 70 partially depicting a semantic network defined by a controlled vocabulary. It should be understood that the graph 70 depicted in FIG. 2 is for illustrative purposes only, and that embodiments are not limited thereto. The structure of the example graph 70 is such that all terms are plotted as vertices in the graph 70 (depicted as circles in the graph 70) with edges connecting them (depicted as lines connecting the vertices in the graph 70). Edges depict a relationship between terms within the controlled vocabulary, such as broader/narrower term relationships or other relationships defined by the particular controlled vocabulary. The "semantic distance" between terms within the controlled vocabulary is defined as the number of edges it takes to navigate from a first term (e.g., term tt) to a second term (e.g., term $t_x$'). For example, the semantic distance between term tt and term $t_x$' is one, while the semantic distance between term tt and term $t_x$" is seven.

Oftentimes a linguistic relationship between child terms and parent terms parallels the hierarchical relationship of the controlled vocabulary. For example, the relationship between "coal mining" and "mining" is such that "mining" is a general term (i.e., the parent term) that subsumes specific terms, such as "coal mining" and "copper mining." The design of the controlled vocabulary expresses this fact: by definition, a parent (broader term) concept subsumes its "child" concepts (narrower terms). In view of this parallelism, the present inventors define two concepts: linguistic inheritance and semantic inheritance.

Linguistic inheritance occurs when the linguistic, syntactic head of a phrase is the linguistic parent. Examples include "mining" and "coal mining," "mining" and "data mining," and "migration" and "cell migration." In the above-referenced examples, "mining" is the linguistic parent of "coal mining" and "data mining," while "migration" is the linguistic parent of "cell migration."

Semantic inheritance is defined by the controlled vocabulary wherein broad terms (parents) are semantically linked to narrower terms (children). Using the examples introduced above, the term "mining" is also the semantic parent to "coal mining" and "copper mining" in addition to being a linguist parent as described above.

However, discrepancies exist between the linguistic and semantic inheritance lines. For example, the phrase "data mining" may not be a type of mining in the sense defined by the controlled vocabulary. In this example, the term "mining" is used metaphorically. The semantic parent for "data mining" may be "computational process" or "computer science," for example, while the linguistic parent is "mining." Therefore, there is a discrepancy between the semantic parent and the linguistic parent, unlike the "mining" and "coal mining" example provided above.

Phrases may be formulated as a term pair comprising a term tt that is a linguistic head of a term $t_x$. Term $t_x$ may be a linguistic derivative of term tt (e.g., "coal mining" ($t_x$) is linguistically a derivative of mining (tt)). Term pairs having a linguistic and semantic discrepancy may be defined as incongruous term pairs comprising term tt and term $t_x$. As used herein "incongruous term pairs" are term pairs wherein tt is a linguistic head of $t_x$, and the semantic distance between $t_x$ and tt is greater than a threshold distance. The threshold distance that is chosen may depend on the particular controlled vocabulary that is utilized or by other considerations. It should be understood that embodiments of the present disclosure are not limited to any particular threshold distance.

Referring once again to FIG. 2, the semantic distance between head term tt and term $t_x'$ is one, while the semantic distance between head term tt and term $t_x''$ is seven. According to the metrics described above, if the threshold distance is six, term pair ($t_x''$, tt) would be considered an incongruous term pair.

On the other hand, term pairs wherein tt is a linguistic head of $t_x$ and the semantic distance between $t_x$ and tt is less than the threshold distance (or another threshold distance) are classified as "congruous term pairs." Embodiments of the present disclosure utilize congruent term pairs to determine congruent compound noun phrases, and to extract multiple controlled vocabulary-defined entities from a single compound noun phrase. As an example and not a limitation, the compound noun phrase "coal mining" is a congruent compound noun phrase because the semantic parent for "coal mining" is "mining," and "mining" is also the linguistic parent or head as defined by the congruent term pair ("coal mining" ($t_x$), "mining" (tt)).

Figure 3:
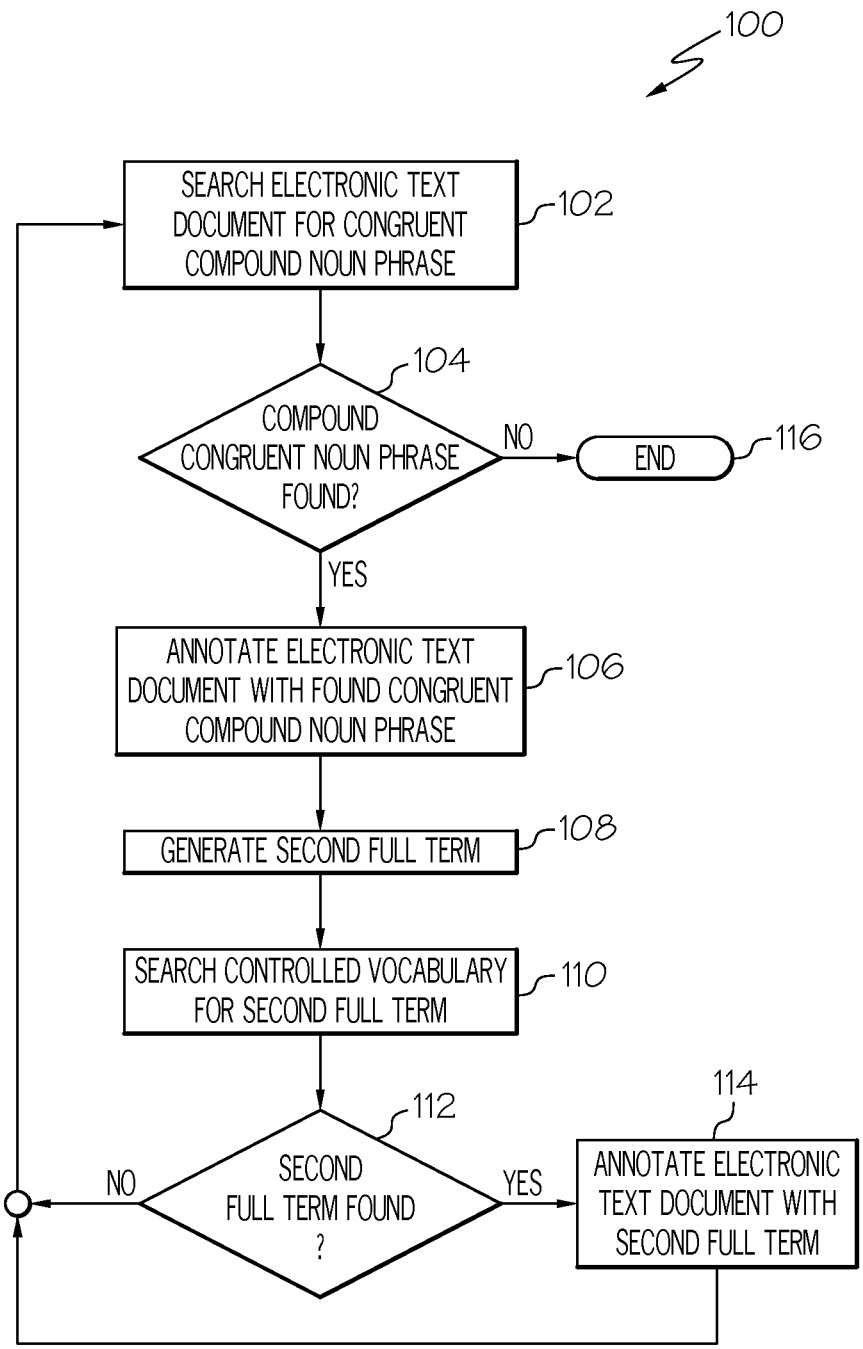
FIG. 3 depicts a flowchart graphically illustrating a computer-implemented method of extracting multiple entities defined in a controlled vocabulary and annotating electronic text documents according to one or more embodiments shown and described herein.

Referring now to FIG. 3, a flowchart 100 showing an example computer-implemented method of annotating an electronic text document with multiple extracted domain-defined entities in a controlled vocabulary from a single compound noun phrase is illustrated. The process starts at block 102 where a particular electronic text document is searched for congruent compound noun phrases.

The electronic text document may be any type of text document. In the illustrated embodiment, the electronic text document is a scientific journal article. In the illustrated embodiment, the process continues toward the extraction process when a congruent compound noun phrase is found.

The electronic text document may be searched by querying the electronic text document for congruent compound noun phrases. In one embodiment, congruent compound noun phrases are extracted from the controlled vocabulary and stored in a data structure prior to searching the text document, as described below with respect to FIG. 4. A congruent compound noun phrase is a multi-word entry having a structure of "X+Z," where "Z" is the head and "X" is a modifier, and the compound noun "X+Z" is a child concept of parent "Z." Accordingly, head word "Z" is a broader, parent concept to child concept "X+Z." In the example provided above, "thin film" is a child concept to parent "film."

The data structure may be organized so that child concepts are organized under the parent concept defined by a common head (e.g., the compound noun phrase "thin film" may be organized under, or otherwise associated with, head word "film" in the data structure). The electronic text document may be searched for the congruent compound noun phrases stored in the data structure.

Congruent compound noun phrases are transparent in the sense that their context is predictable from their composition. As an example and not a limitation, the phrase "barking dog" is transparent, while the phrase "hot dog" is not because "hot dog" could mean a canine having an elevated temperature or a food product. An example method of creating and storing congruent compound noun phrases found in a controlled vocabulary is described below with reference to FIG. 4.

If a congruent compound noun phrase is found in the electronic text document (i.e., if a congruent compound noun phrase that is present in the data structure and/or the controlled vocabulary is found in the electronic text document) at block 104, then the process moves to block 106, where the electronic text document is annotated with the congruent compound noun phrase. If no congruent compound noun phrase is found, the process ends at block 116.

In another embodiment, the electronic text document is searched first for any compound noun phrases whether or not such compound noun phrases are found in the controlled vocabulary. Any method of determining compound noun phrases may be utilized. These multi-word phrases may then be compared with the data structure that includes the congruent compound noun phrases found in the controlled vocabulary. If the multi-word phrase that was identified in the electronic text document is found in the data structure (e.g., "thin film"), then the electronic text document may be annotated within the congruent compound noun phrase that comprises the multi-word phrase. If the multi-word phrase is not found in the data structure storing congruent compound noun phrases found in the controlled vocabulary, then no annotation occurs and the process continues by searching for more compound noun phrases and comparing them with the controlled vocabulary.

The electronic text document may be annotated at block 106 by any known or yet-to-be-developed method of annotating documents. For example, the electronic text document may be annotated using XML. In alternative embodiments, annotations to the electronic text documents may be stored in one or more electronic files that are separate from the electronic text documents. In embodiments, the electronic text document may be annotated with the text of the congruent compound noun phrase and/or or the meaning of the congruent compound noun phrase as defined by the controlled vocabulary.

The congruent compound noun phrase includes a head and a modifier, as described above. At block 108, the area of the text before the congruent compound noun phrase is evaluated. More specifically, the word just prior to the modifier of the congruent compound noun phrase in the electronic text document is determined (i.e., the preceding word). A second full term comprising the preceding word and the head of the congruent compound noun phrase is generated. It is to be understood that the congruent compound noun phrase may also be referred to herein as the first full term. As an example and not a limitation, if the compound noun phrase (i.e., the first full term) is "thin film," and the preceding word is "epitaxial," then the second full term would be "epitaxial film." Similarly, if the compound noun phrase or first full term is "language generation," and the preceding word is "natural," then the second full term would be "natural generation."

It is noted that, in some embodiments, a second full term is not generated when there is a comma following the preceding word and before the modifier.

At block 110, the controlled vocabulary is searched for the second full term that is generated at block 108. The controlled vocabulary may be searched directly or indirectly via the data structure described above wherein child concepts are organized under a parent concept defined by a common head. If the second full term is found in the controlled vocabulary (or, alternatively, the data structure storing compound noun phrases) at block 112, then the electronic text document is annotated with the second full term at block 114. If the second full term is not found in the controlled vocabulary (or, alternatively, the data structure storing compound noun phrases) at block 114, then the process continues to block 102, wherein the electronic text document is searched for another compound noun phrase. Using the above-examples, if "epitaxial film" is found in the controlled vocabulary (or, alternatively, in the data structure storing compound noun phrases), then the electronic text document may be annotated with the text "epitaxial film" and/or the meaning of "epitaxial film" as defined in the controlled vocabulary. Similarly, if "natural generation" is not found in the controlled vocabulary, for example, then the electronic text document is not annotated with the second full term.

The process described above may be repeated until no more compound noun phrases are found, at which point the process ends at block 116.

It should be understood that the electronic text document may be annotated with the found congruent noun phrase after generating the second full term. For example, the electronic text document may be annotated with the found congruent noun phrase after block 110 wherein the controlled vocabulary is searched for the second full term.

In some embodiments, additional full terms may be generated in addition to the second full term. For example, a third full term may be generated by determining the word just prior to the preceding word of the second full term (i.e., the second preceding word). The third full term therefore comprises the second preceding term and the head of the found compound phrase. The controlled vocabulary may be searched for the third full term as described above. If the third full term is found in the controlled vocabulary, the electronic text document may be annotated with the third full term and/or its meaning as defined by the controlled vocabulary.

Figure 4:
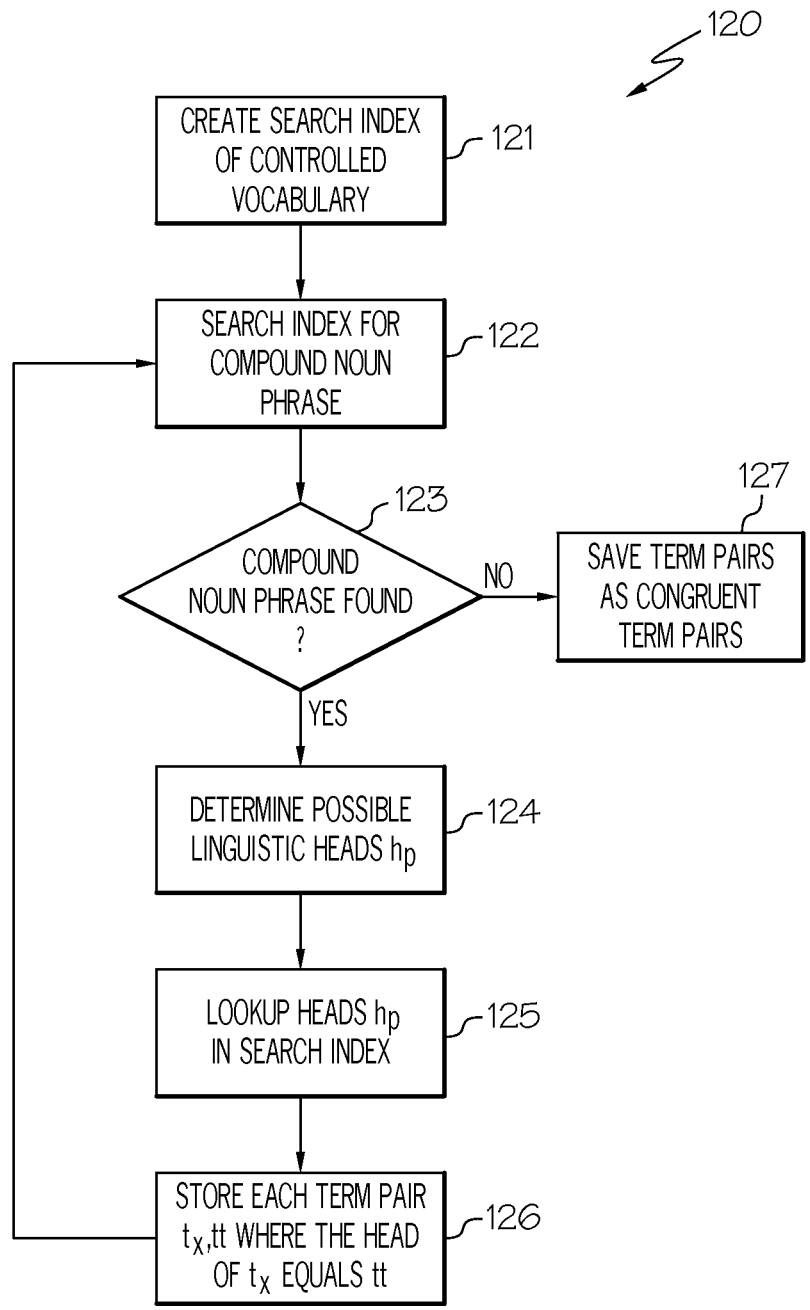
FIG. 4 depicts a flowchart graphically illustrating a computer-implemented method of creating and storing congruent compound noun phrases.

Referring now to FIG. 4, an example process for automatically determining and storing congruent term pairs ($t_x$, tt), and therefore congruent noun phrases, is depicted in a flowchart 120. At block 121, a search index of one or more controlled vocabularies is created and stored in a data structure. Generally, the controlled vocabulary is rearranged such that it is in a searchable form. For example, the phrases stored within the controlled vocabulary may be normalized and sorted for later retrieval. In some embodiments, the controlled vocabulary may be in a searchable form so that it is not necessary to create a search index.

Next, at block 122, compound noun phrases in the controlled vocabulary are determined. As stated above, a compound noun phrase is a phrase comprising a head and a modifier. If a compound noun phrase is found at block 123, the process moves to block 124 where the found compound noun phrase is evaluated.

At block 124, possible linguistic heads $h_p$ of the compound noun phrase are determined. Any known or yet-to-be-developed means for determining linguistic heads $h_p$ of the compound noun phrase may be utilized. As an example and not a limitation, the compound noun phrase that was found at blocks 122 and 123 may be "scanning electron microscopy." This example compound noun phrase has three linguistic heads $h_p$: 1) "microscopy" (modified by "scanning electron"), 2) "electron microscopy" (modified by "scanning"), and 3) "scanning microscopy" (modified by "electron"). Each one of these linguistic heads $h_p$ may be determined at block 124.

Next, at block 125, each linguistic head $h_p$ determined at block 124 is looked up in the search index that was created at block 121 (or looked up in the controlled vocabulary if no search index is created). Term pairs ($t_x$, tt) are created and stored in a data structure at block 126. The term pairs are defined by term $t_x$, which is the compound noun phrase under scrutiny (e.g., "scanning electron microscopy"), and terms tt, which is/are the linguistic heads $h_p$ that were found in the search index in block 125 and where a head of $t_x$ is equal to tt. Using the compound noun phrase "scanning electron microscopy" example, term pairs ($t_x$, tt) that may be created and stored at block 126 include ("scanning electron microscopy", "microscopy"), ("scanning electron microscopy", "electron microscopy"), and ("scanning electron microscopy", "scanning microscopy").

The process continues back to block 122 where the controlled vocabulary is searched for another compound noun phrase. The process may be repeated until no more compound noun phrases are found at block 123. In this manner, term pairs ($t_x$, tt) for the compound noun phrases in the controlled vocabulary may be created and stored.

When no more compound noun phrases are found, the process moves to block 127, where congruent term pairs ($t_x$, tt) are determined from the term pairs ($t_x$, tt) that are stored in the data structure. In embodiments, the congruent term pairs ($t_x$, tt) are determined by evaluating the semantic distance between term $t_x$ and term tt of each term pair ($t_x$, tt) stored in the data structure. As stated above, congruent term pairs are term pairs wherein tt is a linguistic head of $t_x$, and the semantic distance between $t_x$ and tt in the controlled vocabulary is less than a threshold distance. The threshold distance that is chosen may depend on the particular controlled vocabulary that is utilized or by other considerations. As a non-limiting example, the threshold distance may be six. It should be understood that embodiments of the present disclosure are not limited to any particular threshold distance. Accordingly, all term pairs ($t_x$, tt) wherein the semantic distance between term $t_x$ and term tt is less than a threshold distance are saved in a data structure as congruent term pairs ($t_x$, tt). Compound noun phrases appearing as a term $t_x$ in one of the congruent term pairs ($t_x$, tt) in the data structure are considered congruent compound noun phrases.

It should be understood that embodiments are not limited to the process flow depicted in FIG. 4. For example, in some embodiments, all of the compound noun phrases may be determined (e.g., block 122) in one scan, and then each found compound noun phrase may be evaluated to generate congruent term pairs ($t_x$, tt).

It should be understood that embodiments described herein provide for extraction of multiple defined entities from a controlled vocabulary using a single compound noun phrase. Electronic text documents may be annotated with multiple compound noun phrases to provide for more precise annotation with phrases that would otherwise not be detected.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of annotating an electronic text document, the method comprising:

searching, by a computing device, the electronic text document for instances of congruent compound noun phrases comprising a head and a modifier;

determining that a first congruent compound noun phrase is found;

determining a preceding word that precedes the modifier of the first congruent compound noun phrase;

searching a controlled vocabulary for a second congruent compound noun phrase comprising the preceding word and the head of the first congruent compound noun phrase;

determining that the second congruent compound noun phrase is found in the controlled vocabulary; and annotating the electronic text document with the second congruent compound noun phrase comprising the preceding word and the head of the first congruent compound noun phrase.

2. The method of claim 1, further comprising annotating the electronic text document with the first congruent compound noun phrase comprising a head and a modifier of the first congruent compound noun phrase.

3. The method of claim 1, wherein the congruent compound noun phrases are provided in a controlled vocabulary.

4. The method of claim 1, further comprising, if the second congruent compound noun phrase is found in the controlled vocabulary:

determining a second preceding word that precedes the preceding word;

searching the controlled vocabulary for a third congruent compound noun phrase comprising the second preceding word and the head of the first congruent compound noun phrase; and if the third congruent compound noun phrase is found in the controlled vocabulary, annotating the electronic text document with the third congruent compound noun phrase comprising the second preceding word and the head of the first congruent compound noun phrase.

5. The method of claim 1, wherein the controlled vocabulary is organized such that semantically similar compound noun phrases are organized by a common head.

6. The method of claim 5, wherein the electronic text document is annotated with the second congruent compound noun phrase only if the second congruent compound noun phrase is organized under the head of the first compound noun phrase.

7. The method of claim 1, wherein the controlled vocabulary is searched for the second congruent compound noun phrase only if a comma is not present between the preceding word and the modifier of the first congruent compound noun phrase.

8. The method of claim 1, wherein a plurality of congruent compound noun phrases are extracted from the controlled vocabulary and organized by semantically similar compound noun phrases under common heads prior to searching the electronic text document.

9. A non-transitory computer-program product comprising:

a computer-readable medium storing executable instructions that, when executed by a computing device, cause the computing device to:

search an electronic text document for instances of congruent compound noun phrases comprising a head and a modifier;

determine that a first congruent compound noun phrase is found;

determine a preceding word that precedes the modifier of the first congruent compound noun phrase;

search a controlled vocabulary for a second congruent compound noun phrase comprising the preceding word and the head of the first congruent compound noun phrase; and determine that the second congruent compound noun phrase is found in the controlled vocabulary; and annotate the electronic text document with the second congruent compound noun phrase comprising the preceding word and the head of the first congruent compound noun phrase.

10. The computer-program product of claim 9, wherein the executable instructions further cause the computing device to annotate the electronic text document with a first congruent compound noun phrase comprising a head and a modifier of the first congruent compound noun phrase.

11. The computer-program product of claim 9, wherein the congruent compound noun phrases are provided in the controlled vocabulary.

12. The computer-program product of claim 11, wherein the controlled vocabulary is organized such that semantically similar compound noun phrases are organized by a common head.

13. The computer-program product of claim 11, wherein a plurality of congruent compound noun phrases are extracted from the controlled vocabulary and organized by semantically similar compound noun phrases under common heads prior to searching the electronic text document.

14. The computer-program product of claim 9, wherein the computing devices searches the controlled vocabulary for the second congruent compound noun phrase only if a comma is not present between the preceding word and the modifier of the first congruent compound noun phrase.

15. A system for annotating documents, the system comprising:

a processor; and a computer-readable medium storing a controlled vocabulary and executable instructions that, when executed by the processor, causes the processor to:

search an electronic text document for instances of congruent compound noun phrases comprising a head and a modifier;

if a congruent compound noun phrase is found:

determine a preceding word that precedes the modifier of the congruent compound noun phrase;

search the controlled vocabulary for a second full term comprising the preceding word and the head of the congruent compound noun phrase; and if the second full term is found in the controlled vocabulary, annotate the electronic text document with the second full term comprising the preceding word and the head of the congruent compound noun phrase.

16. The system of claim 15, wherein, if the second full term is found in the controlled vocabulary the executable instructions further cause the processor to:

determine a second preceding word that precedes the preceding word;

search the controlled vocabulary for a third full term comprising the second preceding word and the head of the congruent compound noun phrase; and if the third full term is found in the controlled vocabulary, annotate the electronic text document with the third full term comprising the second preceding word and the head of the congruent compound noun phrase.

17. The system of claim 15, wherein the controlled vocabulary is organized such that semantically similar compound noun phrases are organized by a common head.

18. The system of claim 17, wherein the electronic text document is annotated with the second full term only if the second full term is organized under the head of the congruent compound noun phrase.

19. The system of claim 15, wherein the executable instructions cause the processor to search the controlled vocabulary for the second full term only if a comma is not present between the preceding word and the modifier of the congruent compound noun phrase.

20. The system of claim 15, wherein a plurality of congruent compound noun phrases are extracted from the controlled vocabulary and organized by semantically similar compound noun phrases under common heads prior to searching the electronic text document.

* * * * *